United States Patent
Beattie, Jr. et al.

(10) Patent No.: US 8,144,616 B2
(45) Date of Patent: Mar. 27, 2012

(54) SYSTEM AND METHOD FOR MAPPING INTERNET PROTOCOL TELEVISION INTERFERENCE

(75) Inventors: James G. Beattie, Jr., Bergenfield, NJ (US); Eric S. Forbes, Canton, GA (US); William H. Greer, Marietta, GA (US); Stephen J. Griesmer, Westfield, NJ (US); Scott T. MacKenzie, Wheeling, IL (US); Arvind R. Mallya, Walnut Creek, CA (US); Gregory D. Olson, Plano, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 341 days.

(21) Appl. No.: 12/610,970

(22) Filed: Nov. 2, 2009

(65) Prior Publication Data

US 2011/0103231 A1     May 5, 2011

(51) Int. Cl.
*H04J 1/16*     (2006.01)
(52) U.S. Cl. ........................................ 370/252
(58) Field of Classification Search .............. 370/241, 370/242, 244, 252, 248, 431, 445, 447, 458, 370/461, 462; 379/1.01, 22, 22.03, 32.01, 379/35
See application file for complete search history.

(56) References Cited

U.S. PATENT DOCUMENTS

| | | | |
|---|---|---|---|
| 2002/0060735 A1* | 5/2002 | Bowyer et al. | 348/180 |
| 2004/0214544 A1 | 10/2004 | Fawcett | |
| 2006/0067237 A1 | 3/2006 | Burns et al. | |
| 2007/0133421 A1 | 6/2007 | Young | |
| 2007/0263778 A1 | 11/2007 | Aydin et al. | |
| 2008/0188185 A1 | 8/2008 | Shi | |
| 2009/0096665 A1* | 4/2009 | Maxson et al. | 342/357.08 |
| 2009/0144791 A1 | 6/2009 | Huffman et al. | |
| 2009/0167945 A1 | 7/2009 | Tsui et al. | |

* cited by examiner

*Primary Examiner* — Kwang B Yao
*Assistant Examiner* — Obaidul Huq
(74) *Attorney, Agent, or Firm* — Guntin Meles & Gust, PLC; Ed Guntin

(57) ABSTRACT

A method in a server for monitoring an Internet Protocol television (IPTV) service for a customer premises is disclosed. A first geographical location of a customer premises is retrieved, and a second geographical location of an amplitude modulation broadcasting facility within a threshold distance from the customer premises is retrieved. A first signal transmission power rating for the amplitude modulation broadcasting facility during daytime hours is retrieved, as is second signal transmission power rating for the amplitude modulation broadcasting facility during nighttime hours. A time of day that the IPTV service failure occurs is determined based on the first signal transmission power rating for the daytime hours and the second signal transmission power rating for the nighttime hours.

20 Claims, 11 Drawing Sheets

SYSTEM AND METHOD FOR MAPPING INTERNET PROTOCOL TELEVISION INTERFERENCE

FIELD OF THE DISCLOSURE

The present disclosure generally relates to communications networks, and more particularly relates to a system and a method for mapping Internet Protocol television interference.

BACKGROUND

An Internet Protocol television (IPTV) service provider can transmit an IPTV signal to a user via a central office, a serving area interface, and a residential gateway. The IPTV service provider can offer the user a variety of different television programs and/or movies. For example, the IPTV service provider can supply users with real-time television programs that are typically available for the users to watch only at a specific date and time. The IPTV service provider can also offer the users on-demand movies that are available for an extended amount of time and that are provided to the users upon request of the on-demand movie.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
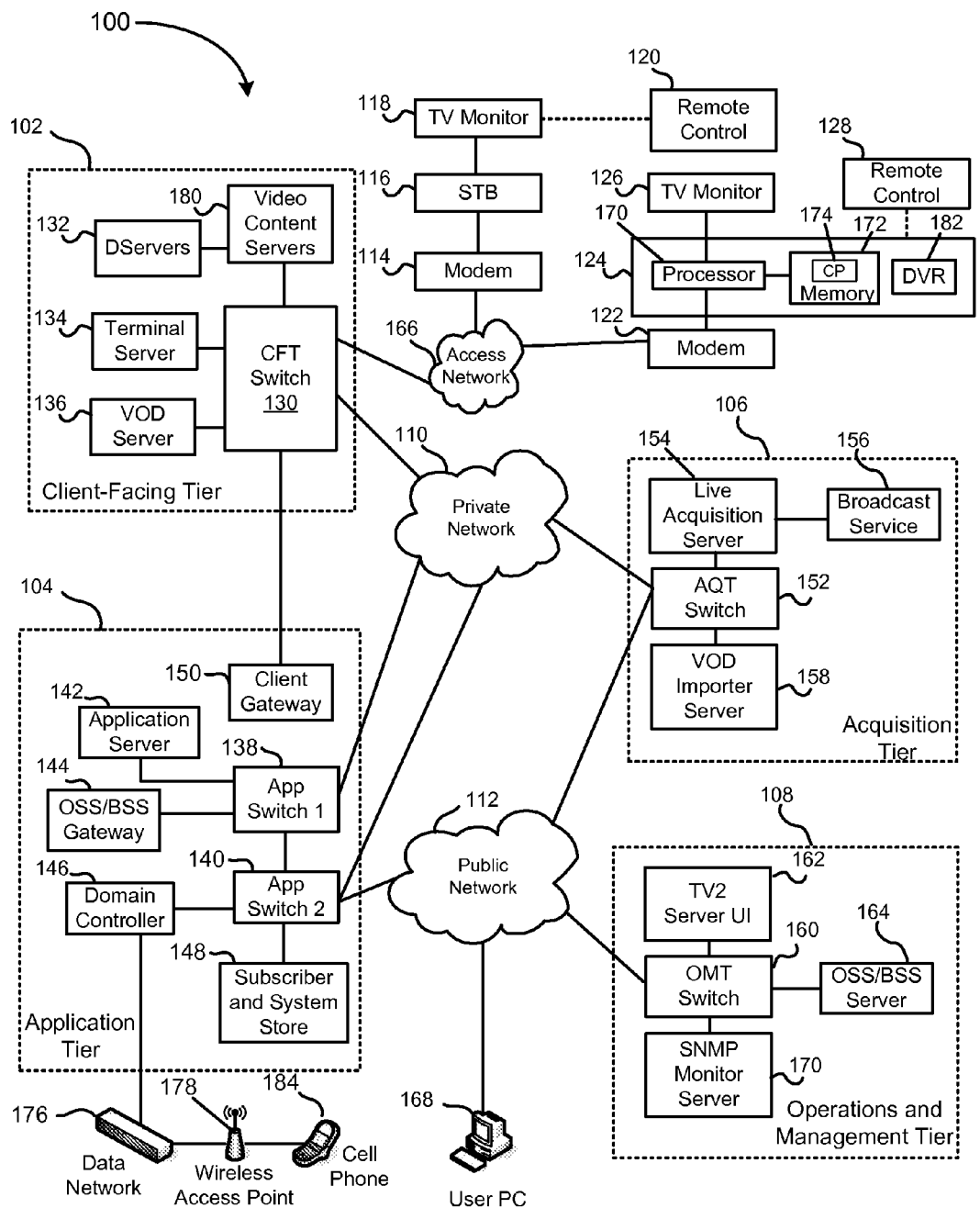
FIG. 1 is a block diagram of an Internet Protocol Television (IPTV) system.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106, and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems such as a first modem 114 and a second modem 122 can be coupled to the private access network 166. The client-facing tier 102 can communicate with a first representative set-top box device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft® TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device 124 can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include a set-top box processor 170 and a set-top box memory device 172 that is accessible to the set-top box processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an operation systems and support/billing systems and support (OSS/BSS) gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes OSS data, as well as BSS data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the first set-top box device 116 access to IPTV content and VOD content. If the client gateway 150 cannot verify subscriber information for the first set-top box device 116, such as because it is connected to a different twisted pair, the client gateway 150 can deny transmissions to and from the first set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 166 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access point 178 can communicate with user wireless devices such as a cellular telephone 184.

In a particular embodiment, the set-top box devices can include a set-top box computer program 174 that is embedded within the set-top box memory device 172. The set-top box computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating second set-top box device with a user account, or with any combination of these.

Figure 2:
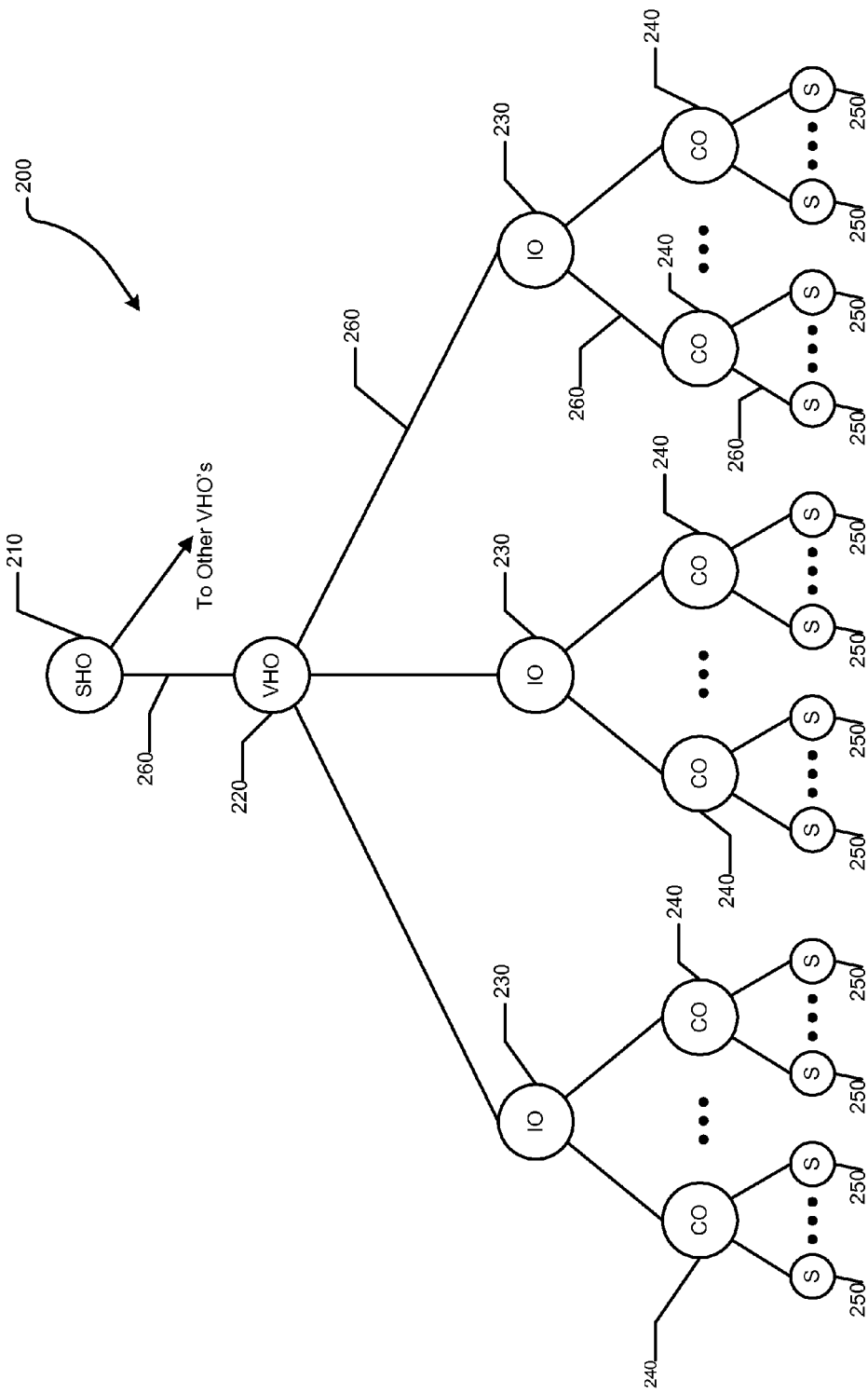
FIGS. 2 and 3 are block diagrams of an embodiment of an IPTV network.

FIG. 2 shows one example embodiment of a television distribution system or network 200, using IPTV technology in this example but not limited thereto, adapted to provide, among other things, the live television content features of the disclosed subject matter. The network 200 may include a super hub office (SHO) 210 for acquisition and encoding of video content, one or more video hub offices (VHO) 220 in each demographic market area (DMA), one or more intermediate offices (IO) 230, one or more central offices (CO) 240 located in each metropolitan area, and subscribers 250, who may be located in single or multiple dwelling units. In one example embodiment, the network 200 may be connected through a plurality of high speed communication links 260 using physical transport layers such as fiber, cable, twisted pair, air, or other media.

In one example embodiment of the IPTV video delivery system, the SHO 210 distributes content to one or more VHOs 220 which may be spread across a wide geographic territory, such as an entire country. The SHO 210 may, for example, be in a central location for acquisition and aggregation of national-level broadcast television (or linear) programming. A redundant SHO 210 may be provided for backup in case of failure. The SHO 210 may also provide the central point of live television content acquisition and insertion into the IPTV network. Linear programming may be received at the SHO 210 via satellite and processed for delivery to the VHO 220. Live television content may be received from various sources and processed/encoded to codec and bit-rate requirements for the communication network for transmission to the VHO 220 over the high speed communication links. The VHOs 220 are the video distribution points within each DMA or geographic region.

Figure 3:
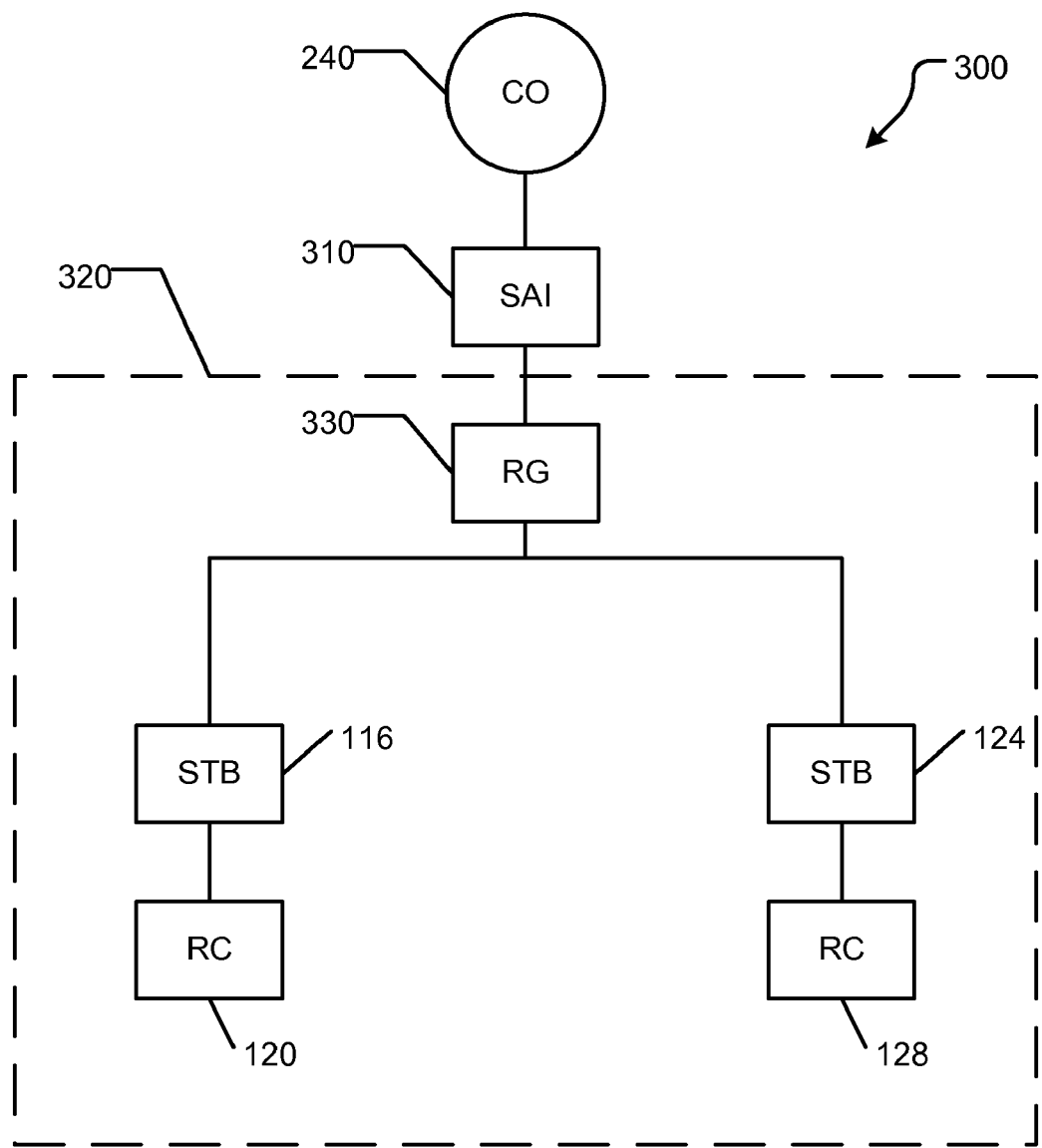

FIG. 3 shows an exemplary network architecture 300 between the CO 240 and customer premises equipment (CPE) 320 of the subscriber 250 shown in FIG. 2. A serving area interface (SAI) or video ready access device (VRAD) 310 may be connected to the CO 240. SAI 310 may, for example, be located in a weather-proof enclosure proximate the subscriber 250 premises, and may include fiber-to-the-node (FTTN) equipment, such as a digital subscriber line access multiplexer (DSLAM). FTTN equipment may also be located in the CO 240. The customer premises equipment (CPE) 320 includes, for example, a network interface device (not shown) and a residential gateway (RG) 330, with a built-in very-high-bit-rate digital subscriber loop (VDSL) modem or optical network termination (ONT). In either case the RG 330 may be connected to the rest of the home set-top box devices 116 and 124 via an internal network such as an Ethernet. The set-top box devices 116 and 124 each have an associated remote control device 120 and 128 which provides data entry to the set-top box devices to control the IPTV selections from the IPTV data streams.

Figure 4:
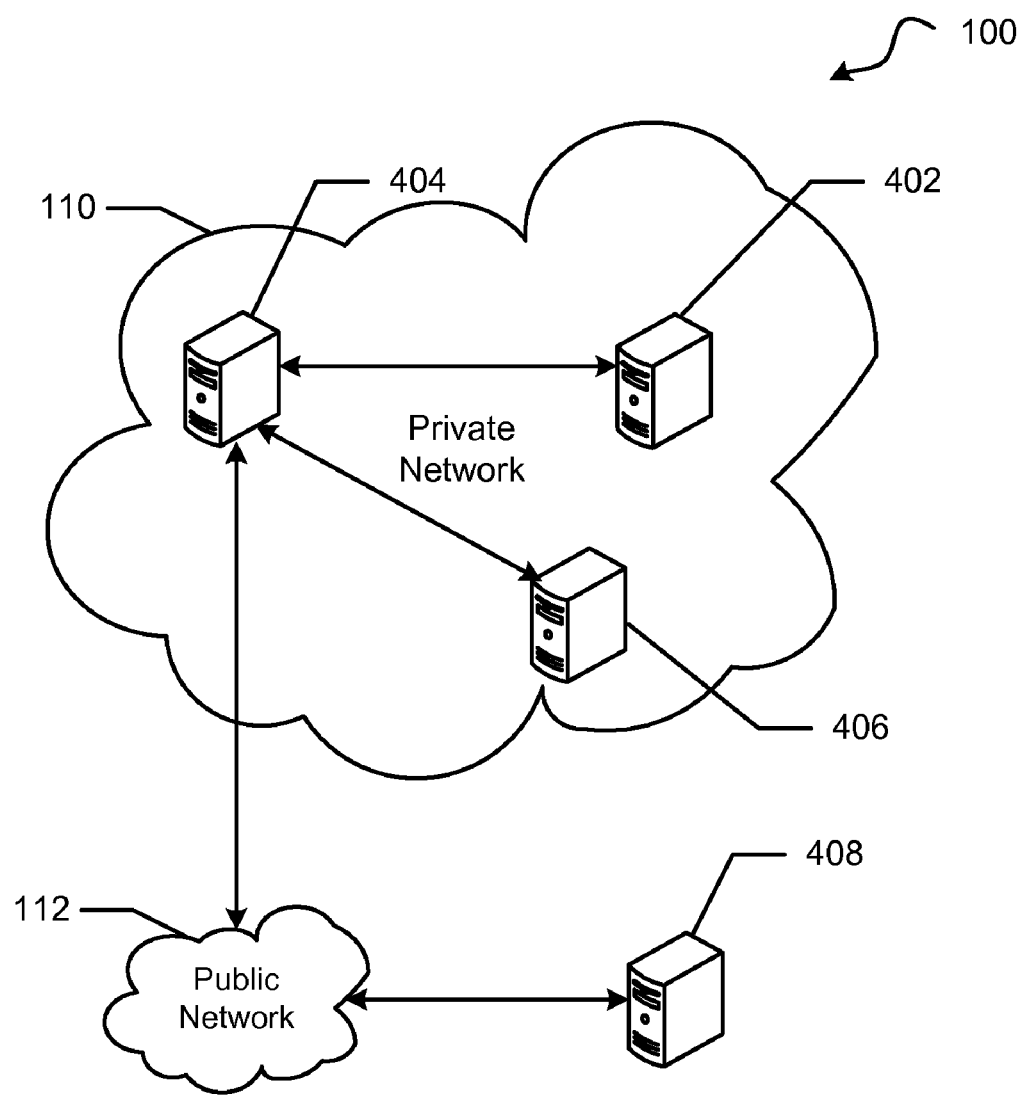
FIG. 4 is a block and schematic diagram of a portion of the IPTV system.

FIG. 4 shows a portion of the IPTV system 100 including an IPTV monitor server 402, a test server 404, and an IPTV location server 406. In an embodiment, the IPTV monitor server 402, the test server 404, and the IPTV location server 406 are all preferably located within an IPTV provider network, such as the private network 110. The IPTV monitor server 402 is in communication with the test server 404, which in turn is in communication with the IPTV location server 406. In one embodiment, the test server 404 is also in communication with a Federal Communications Commission (FCC) server 408 via the public network 112.

The IPTV monitor server 402 can determine that multiple IPTV customers are experiencing a service quality below an acceptable level. For example, the IPTV monitor 402 can indicate that multiple ITPV customers connected to one of the RGs 330 are reporting problems with the IPTV service from the IPTV system 100 of FIG. 1. The problems can be in the RG 330, the customer premises equipment, the VRAD 310, of the IPTV cables connecting the VRAD to the RG and the customer premises equipment to the RG. In one embodiment, the IPTV cable can preferably be a twisted pair wire between the VRAD 310 and the RG 330. In another embodiment, the IPTV cable can be a fiber optic cable connecting the VRAD 310 to the RG 330. The IPTV monitor server 402 can send an alarm signal to the test server 404. After receiving the alarm signal, the test server 404 can determine if any sources of interference to the IPTV signal exist within a geographical location associated with the user connected to the RG 330 and the VRAD 310.

While determining any sources of interference, the test server 404 can retrieve information about an area surrounding the geographical location of the new user installation from the IPTV location server 406. The information can include a geographical location of the each of the VRADs 310, a geographical location of each of the RGs 330 and/or customer premises, a geographical location of projected IPTV cable routes from the VRADs to each of the RGs and/or customer premises, and the like. The test server 404 can access a database of the FCC server 408 to retrieve geographical locations of amplitude modulation (AM) broadcasting facilities, which can be sources of interference for an IPTV signal transmitted over the IPTV cables from the VRADs 310 to the RGs 330 and/or the customer premises. The test server 404 can also access the FCC server 408 to retrieve power levels and/or transmission power ratings for the signals broadcast from the AM broadcasting facility. The information can also include the power levels for the AM broadcasting facility both during the daytime and during the nighttime. The power levels are different for the same AM broadcasting facility during the daytime and nighttime because the FCC regulates the power levels differently during daytime hours and nighttime hours. Upon retrieving the information from the IPTV location server 406 and the FCC server 408, the test server 404 can plot and/or map graphical representations of the VRADs 310, the RGs 330, and the AM broadcasting facilities at different locations on a graphical user interface (GUI) representing a large area surrounding the location associated with the new user installation, as shown in FIG. 5.

Figure 5:
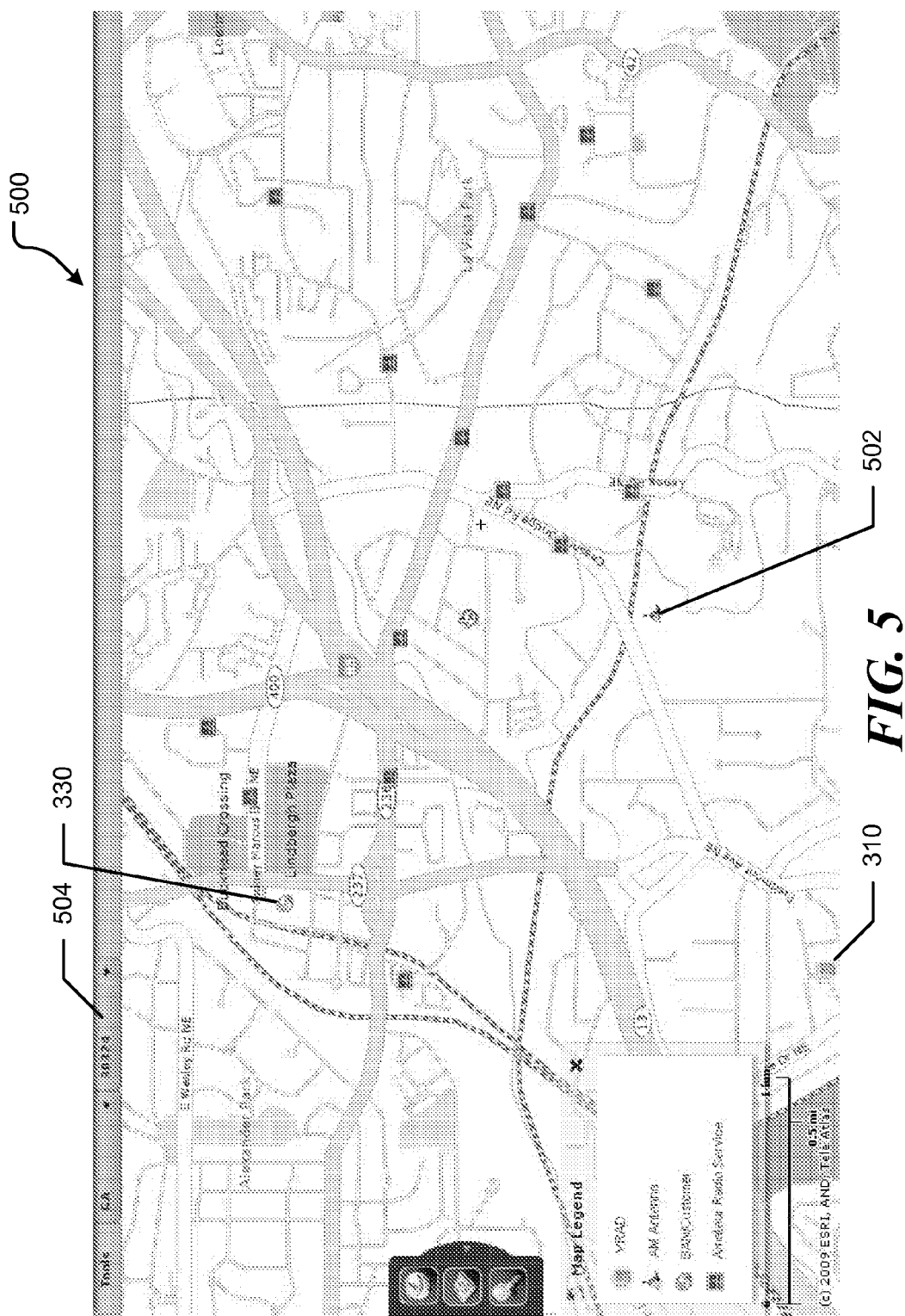
FIG. 5 is an exemplary screen shot of a mapping of sources of interference with an IPTV signal.

FIG. 5 shows an exemplary screen shot 500 of a plot of sources of potential IPTV signal interference. The exemplary screen shot 500 includes the VRADs 310, the RGs 330, an AM broadcasting facility 502, and a search toolbar 504. In an embodiment, the screen shot 500 can be a GUI associated with the test server 404 such that a user can enter a location into the search tool bar 504 and can view graphical representations of the VRADs 310, the RGs 330 and the AM broadcasting facilities 502 located within the specific location. For example, the test server 404 can use the location, such as a zip code, entered into the search toolbar 504 to search and retrieve the information associated with a large geographical location around the area from the IPTV location server 406 and the FCC server 408. The test server 404 can then display graphical representations of the large geographical location as shown in the exemplary screen shot 500.

When the different geographical representations are plotted and/or mapped, the test server 404 can determine the distances between the AM broadcasting facilities 502 and the VRADs 310, and the RGs and/or customer premises 330. Each of the distances can be stored in a database of the test server 404 for later reference.

In an embodiment, the user can vary the GUI display of the large geographical location. For example, if the user wants to view a specific location of the area entered into the search toolbar 504, the user can pan across the area, zoom in or out in on a specific location, and the like. Thus, the GUI displayed by the test server 404 can provide the user with a graphical representation of the locations and distances between the VRADs 310, the RGs and/or customer premises 330, and the AM broadcasting facilities 502. The test server 404 can retrieve the power levels and/or transmission power ratings for the signals broadcast from each AM broadcasting facility 502. For example, the power level for the signals can range from two hundred Watts to fifty Kilowatts depending on the AM broadcasting facility 502 and the time of day as represented in a signal power level chart 600 of FIG. 6.

Figure 6:
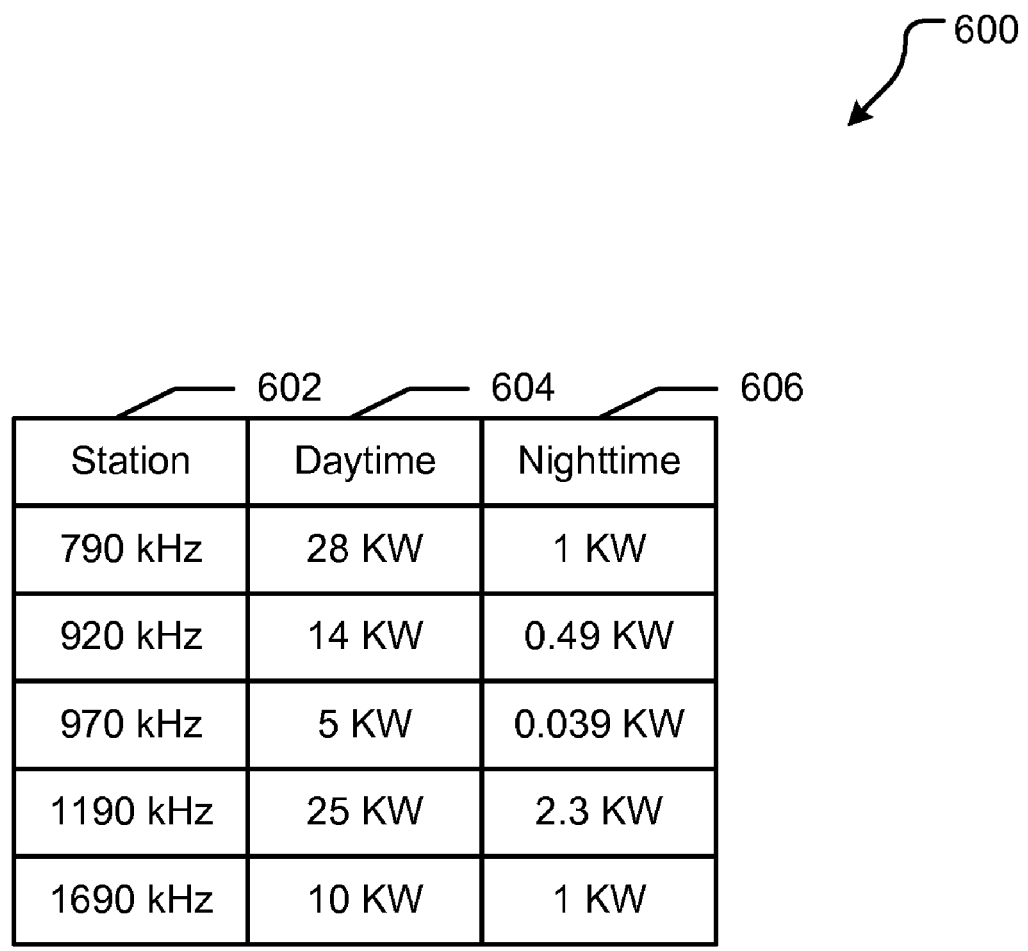
FIG. 6 is an exemplary chart for signal power levels in amplitude modulation broadcasting facilities.

FIG. 6 shows the signal power level chart 600 including a station column 602, a daytime power level column 604, and a nighttime power level column 606. The test server 404 can retrieve the power levels for multiple AM broadcasting facilities in a geographical area from the FCC server 408 and store the information in a database the signal power level chart 600. For example, the station allocated the 790 kilohertz (kHz) bandwidth broadcast at a daytime power level of twenty eight kilowatts (KW) as listed in the daytime power level column 604, and a nighttime power level of one KW as listed in the nighttime power level column 606.

Thus, this AM broadcasting facility can cause more interference to the IPTV signals during the daytime than the nighttime based on the signal power levels. The test server 404 can use the information along with the locations of the VRADs 310 and the RGs 330 to determine the amount of interference on the IPTV signals from each of the stations listed in the station column 602 during the daytime and the nighttime. The test server 404 can use the information in the signal power level chart 600 to determine any possible solutions to reduce the interference on the IPTV signals during different times of the day as discussed below.

Returning again to FIG. 5, an amount potential interference caused by the AM broadcasting facility 502 can depend on a combination of the power levels of the broadcast signals from the AM broadcasting facility, and the distance the AM broadcasting facility is from the VRAD 310 and the RG 330. Thus, a threshold distance for determining potential interference can vary depending on the power level of the broadcast signal from the AM broadcasting facility 502. For example, if the AM broadcasting facility 502 operates with a power level of five Kilowatts for the broadcast signal, the threshold distance can be ten kilometers before the AM broadcasting facility causes any potential interference with an IPTV signal.

Thus, the test server 404 can determine whether there might be sources of interference with an IPTV signal traveling from the VRAD 310 to the RG 330 based on whether the AM broadcasting facility 502 is within the threshold distance as determined in response to the power level of the broadcast signal from the AM broadcasting facility based on the time of day. The sources of interference can cause problems with the IPTV signal, Voice over Internet Protocol (VoIP) telephone signal, and/or IP data signals transmitted over the IPTV cable route. The possible problems caused by the interference can include an inability for the RG 330 to synchronize with the VRAD 310, pixelization and/or loss of IPTV video signal, dropout or complete loss of the VoIP telephone signal, intermediate and/or continuous disruption of data sent over the IP data line of the IPTV cable route, and the like.

Upon identifying at least one source of interference of the IPTV signal, the test server 404 can select different mitigation strategies to limit the effect of the source interference. The mitigation strategies can include repairing the IPTV cable, connecting bridge taps in the VRAD 310, twisting the IPTV cables located in the VRAD, installing filters at the RGs and/or customer premises 330, and the like. The filters can be designed to block signals within the frequency ranges of the broadcast signals from the AM broadcasting facility 502. The test server 404 can assign these mitigation strategies as a support ticket for the technicians responsible for completing the new user installation request.

Figure 7:
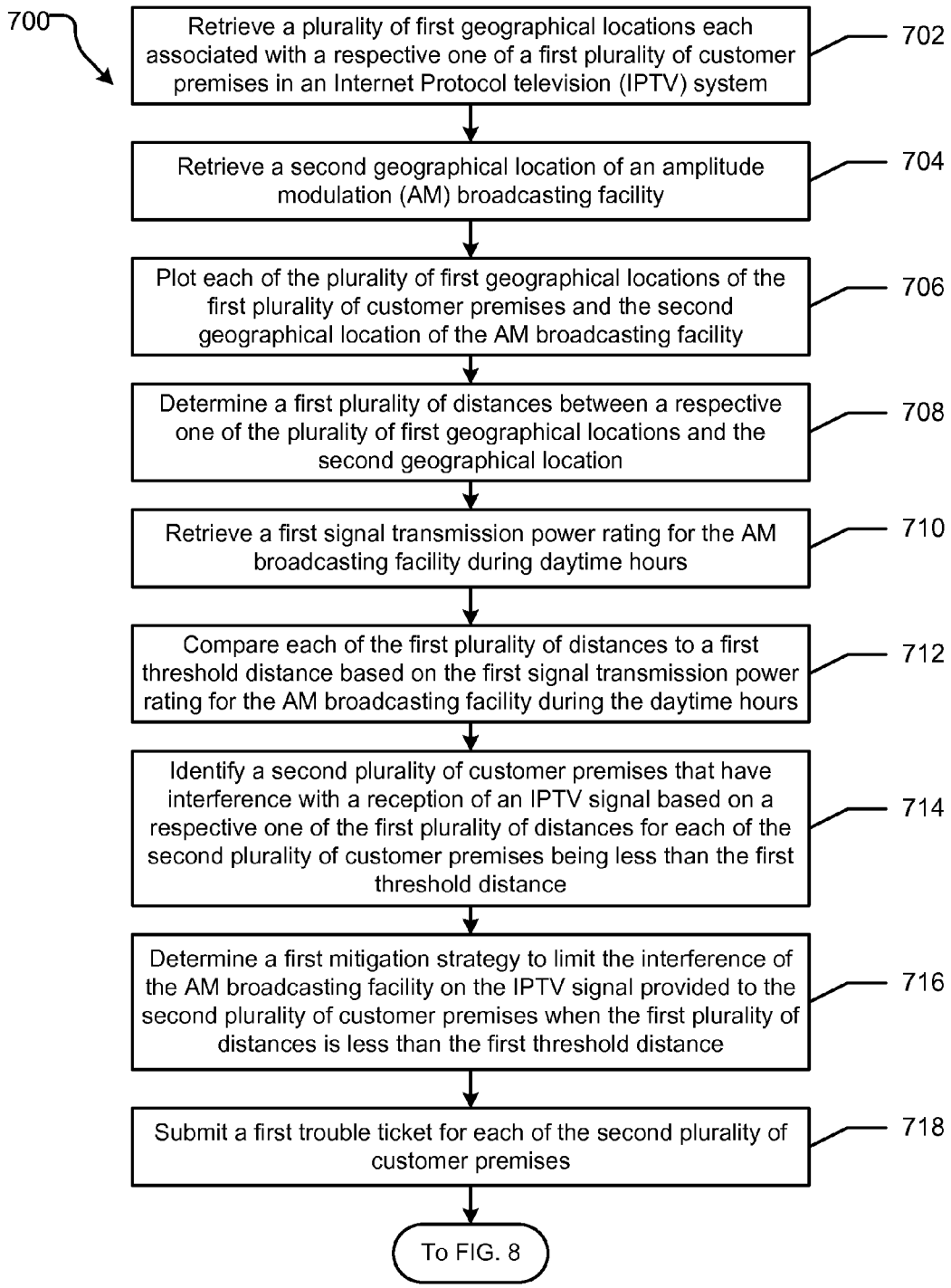
FIGS. 7-8 are flow diagrams of a method for determining a mitigation strategy to limit the interference with the IPTV signal.
Figure 8:
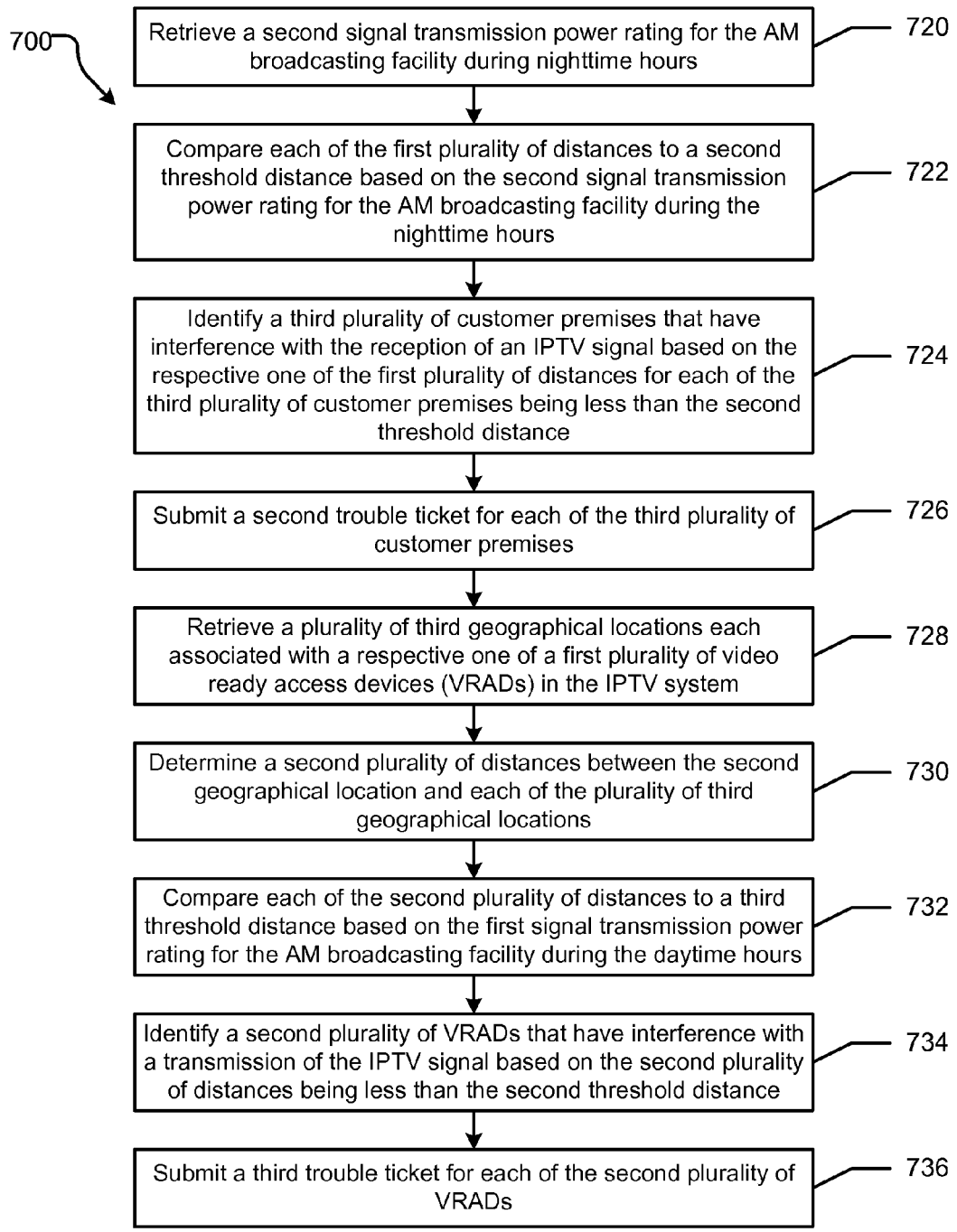

FIGS. 7-8 show a method 700 for determining a mitigation strategy to limit the interference with the IPTV signal. At block 702, a plurality of first geographical locations each associated with a respective one of a first plurality of customer premises in an IPTV system are retrieved. A second geographical location of an AM broadcasting facility is retrieved at block 704. At block 706, each of the plurality of first geographical locations of the first plurality of customer premises, and the second geographical location of the AM broadcasting facility are plotted. A first plurality of distances is determined at block 708. Each of the first plurality of distances between a respective one of the plurality of first geographical locations and the second geographical location. At block 710, a first signal transmission power rating for the AM broadcasting facility during daytime hours is retrieved.

At block 712, each of the first plurality of distances are compared to a first threshold distance based on the first signal transmission power rating for the AM broadcasting facility during the daytime hours. A second plurality of customer premises are identified that have interference with a reception of an IPTV signal based on a respective one of the first plurality of distances for each of the second plurality of customer premises being less than the first threshold distance at block 714. At block 716, a first mitigation strategy to limit the interference of the AM broadcasting facility on the IPTV signal provided to the second plurality of customer premises when the first plurality of distances is less than the first threshold distance. A first trouble ticket is submitted for each of the second plurality of customer premises at block 718.

At block 720, a second signal transmission power rating for the AM broadcasting facility during nighttime hours is retrieved. Each of the first plurality of distances between each of the plurality of first geographical locations and the second geographical location is compared to a second threshold distance at block 722. The second threshold distance is based on the second signal transmission power rating for the AM broadcasting facility during the nighttime hours. At block 724, a third plurality of customer premises are identified that have interference with the reception of an IPTV signal based on the respective one of the first plurality of distances for each of the third plurality of customer premises being less than the second threshold distance. A trouble ticket is submitted for each of the third plurality of customer premises at block 726.

At block 728, a plurality of third geographical locations each associated with a respective one of a first plurality of VRADs in the IPTV system is retrieved. A second plurality of distances is determined at block 730. Each of the second plurality of distances is between the second geographical location and each of a respective one of the plurality of third geographical locations. At block 732, each of the second distances is compared to a third threshold distance based on the first signal transmission power rating of the AM broadcasting facility during the daytime hours. A second plurality of VRADs are identified that have interference with a transmission of the IPTV signal based on the second plurality of distances being less than the third threshold distances at block 734. At block 736, a third trouble ticket is submitted for each of the second plurality of VRADs.

Figure 9:
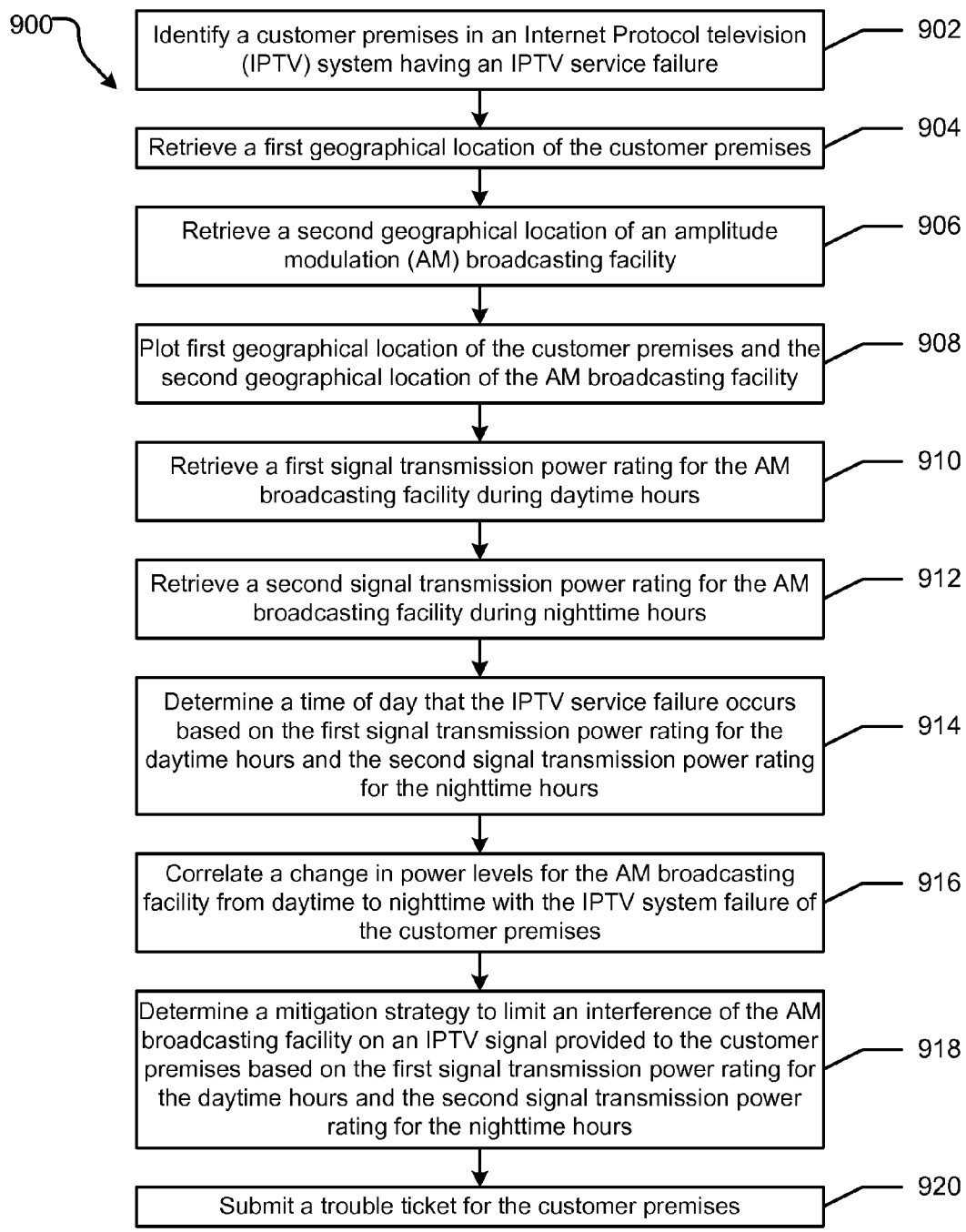
FIG. 9 is a flow diagram of a method for determining an alternative mitigation strategy for a customer premises having an IPTV service failure.

FIG. 9 shows a method 900 for determining an alternative mitigation strategy for a customer premises having an IPTV service failure. At block 902, a customer premises in an ITPV system having an ITPV service failure is identified. A first geographical location of the customer premises is retrieved at block 904. At block 906, a second geographical location of an AM broadcasting facility is retrieved. The first geographical location of the customer premises and the second geographical location of the AM broadcasting facility are plotted at block 908. At block 910, a first signal transmission power rating for the AM broadcasting facility during daytime hours is retrieved. A second signal transmission power rating for the AM broadcasting facility during nighttime hours is retrieved at block 912.

At block 914, a time of day that the IPTV service failure occurs at the customer premises is determined based on the first signal transmission power rating for the daytime hours and the second signal transmission power rating for the nighttime hours. A change in the power levels for the AM broadcasting facility is correlated with the IPTV system failure at the customer premises at block 916. At block 918, a mitigation strategy to limit an interference of the AM broadcasting facility on an IPTV signal provided to the customer premises is determined based on the first signal transmission power rating for the daytime hours and the second signal transmission power rating for the nighttime hours. A trouble ticket is submitted for the customer premises at block 920.

Figure 10:
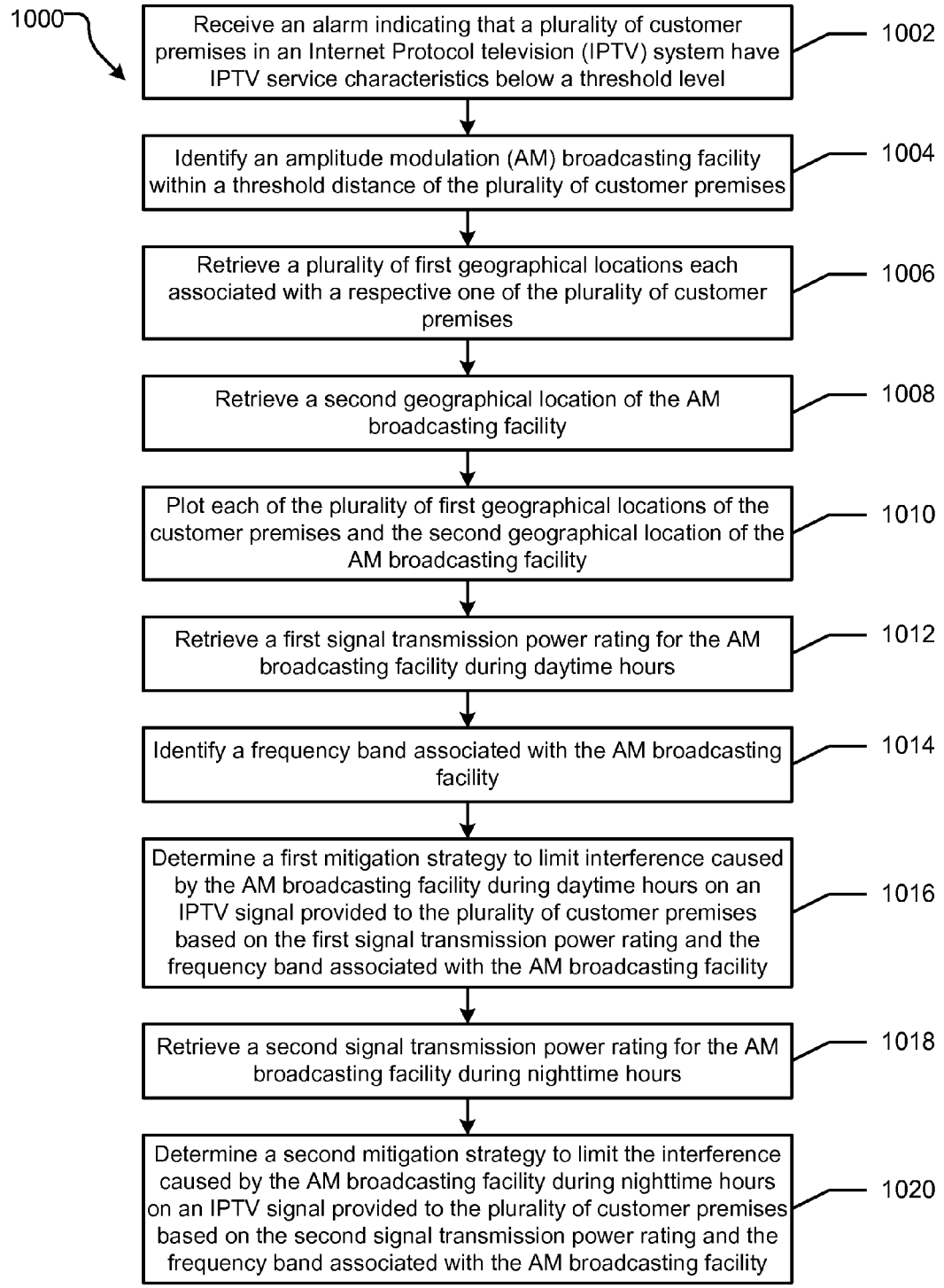
FIG. 10 is a flow diagram of a method for an additional mitigation strategy for a customer premises having an IPTV service characteristic below a threshold level.

FIG. 10 shows a method 1000 for an additional mitigation strategy for a customer premises having an IPTV service characteristic below a threshold level. At block 1002, an alarm indicating that a plurality of customer premises in an IPTV system have IPTV service characteristics below a threshold level is received. An AM broadcasting facility within a threshold distance of the plurality of customer premises is identified at block 1004. At block 1006, a plurality of first geographical locations is retrieved. Each of the plurality of first geographical locations is associated with a respective one of the plurality of customer premises. A second geographical location of the AM broadcasting facility is determined at block 1008. At block 1010, each of the plurality of first geographical locations of the customer premises and the second geographical location of the AM broadcasting facility are plotted.

A first signal transmission power rating is retrieved for the AM broadcasting facility during daytime hours at block 1012. At block 1014, a frequency band associated with the AM broadcasting facility is identified. A first mitigation strategy to limit interference caused by the AM broadcasting facility during daytime hours on an IPTV signal provided to the plurality of customer premises is determined based on the first signal transmission power rating and the frequency band associated with the AM broadcasting facility at block 1016. At block 1018, a second signal transmission power rating is retrieved for the AM broadcasting facility. A second mitigation strategy to limit the interference caused by the AM broadcasting facility during nighttime hours on the IPTV signal provided to the plurality of customer premises is determined based on the second signal transmission power rating and the frequency band associated with the AM broadcasting facility at block 1020.

Figure 11:
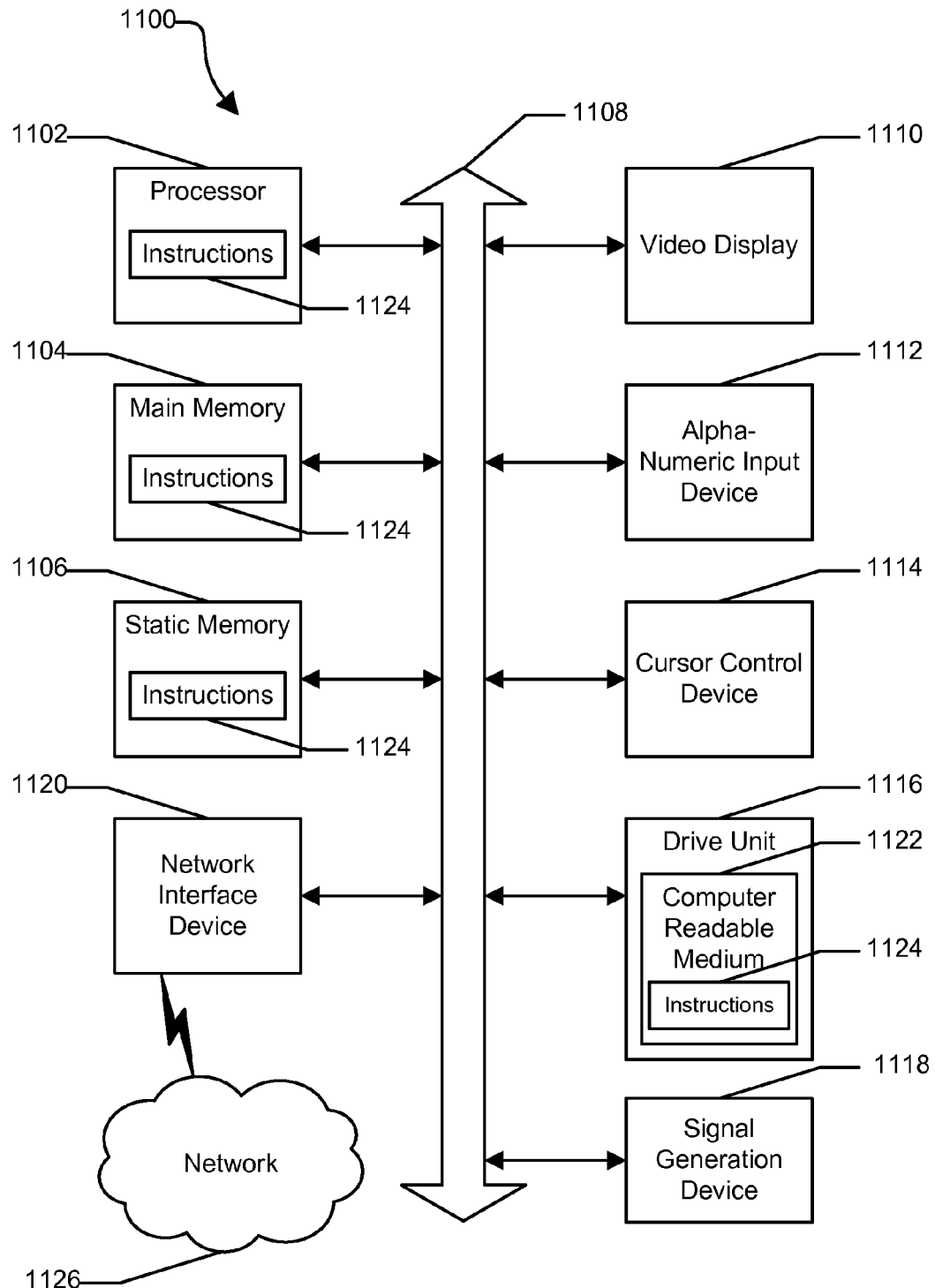
FIG. 11 is an illustrative embodiment of a general computer system.

FIG. 11 shows an illustrative embodiment of a general computer system 1100. The computer system 1100 can include a set of instructions that can be executed to cause the computer system to perform any one or more of the methods or computer based functions disclosed herein. The computer system 1100 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1100 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1100 can be implemented using electronic devices that provide voice, video or data communication. Further, while a single computer system 1100 is illustrated, the term "system" shall also be taken to include any collection of systems or sub-systems that individually or jointly execute a set, or multiple sets, of instructions to perform one or more computer functions.

The computer system 1100 may include a processor 1102, such as a central processing unit (CPU), a graphics processing unit (GPU), or both. Moreover, the computer system 1100 can include a main memory 1104 and a static memory 1106 that can communicate with each other via a bus 1108. As shown, the computer system 1100 may further include a video display unit 1110 such as a liquid crystal display (LCD), an organic light emitting diode (OLED), a flat panel display, a solid state display, or a cathode ray tube (CRT). Additionally, the computer system 1100 may include an input device 1112 such as a keyboard, and a cursor control device 1114 such as a mouse. The computer system 1100 can also include a disk drive unit 1116, a signal generation device 1118 such as a speaker or remote control, and a network interface device 1120 to communicate with a network 1126. In a particular embodiment, the disk drive unit 1116 may include a computer-readable medium 1122 in which one or more sets of instructions 1124, such as software, can be embedded. Further, the instructions 1124 may embody one or more of the methods or logic as described herein. In a particular embodiment, the instructions 1124 may reside completely, or at least partially, within the main memory 1104, the static memory 1106, and/or within the processor 1102 during execution by the computer system 1100. The main memory 1104 and the processor 1102 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A device comprising:
    a memory; and
    a processor coupled to the memory, wherein the memory comprises computer instructions which when executed by the processor, configures the processor to:
    retrieve a plurality of first geographical locations associated with a respective one of a first plurality of customer premises in an Internet Protocol television (IPTV) system; retrieve a second geographical location of an amplitude modulation broadcasting facility;
    determine a first plurality of distances between the second geographical location and a respective one of the first geographical locations; retrieve a first signal transmission power rating for the amplitude modulation broadcasting facility during daytime hours;
    compare each of the first plurality of distances to a first threshold distance based on the signal transmission power rating for the amplitude modulation broadcasting facility during the daytime hours; and
    identify a second plurality of customer premises that have interference with reception of an IPTV signal when a respective one of the first distances for each of the second plurality of customer premises is less than the first threshold distance.

2. The device of claim 1 wherein the processor is further configured to:
    plot each of the plurality of first geographical locations of the customer premises and the second geographical location of the amplitude modulation broadcasting facility on a graphical user interface.

3. The device of claim 1 wherein the processor is further configured to:
    determine a first mitigation strategy to limit a first interference of the amplitude modulation broadcasting facility on the IPTV signal provided to the second plurality of customer premises when the first plurality of distances is less than the first threshold distance.

4. The device of claim 3 wherein the first mitigation strategy is to apply filters for a frequency associated with a signal of the amplitude modulation broadcasting facility, wherein the filters are installed at the customer premises.

5. The device of claim 1 wherein the processor is further configured to:
    submit a first trouble ticket for each of the second plurality of customer premises.

6. The device of claim 1 wherein the processor is further configured to:
    retrieve a second signal transmission power rating for the amplitude modulation broadcasting facility during nighttime hours;
    compare each of the first plurality of distances to a second threshold distance based on the signal transmission power rating for the amplitude modulation broadcasting facility during the nighttime hours; and
    identify a third plurality of customer premises that have interference with the reception of the IPTV signal when the respective one of the first distances for each of the third plurality of customer premises is less than the second threshold distance.

7. The device of claim 1 wherein the processor is further configured to:
    retrieve a plurality of third geographical locations associated with a respective one of a first plurality of video ready access devices;
    determine a second plurality of distances between the second geographical location and a respective one of the third geographical locations;

compare the second plurality of distances to a second threshold distance based on the first signal transmission power rating for the amplitude modulation broadcasting facility during daytime hours; and identify a second plurality of video ready access devices that have interference with transmission of the IPTV signal when a respective one of the second distances for each of the second plurality of video ready access devices is less than the second threshold distance.

8. The device of claim 1 wherein the first interference of the amplitude modulation broadcasting facility causes a loss of the IPTV signal.

9. The device of claim 1 wherein the first interference of the amplitude modulation broadcasting facility causes pixelization of an output of the IPTV signal.

10. A method in a server for monitoring an Internet Protocol television (IPTV) service for a customer premises, the method comprising:

identifying the customer premises having an IPTV service failure;

retrieving a first geographical location of the customer premises;

retrieving a second geographical location of an amplitude modulation broadcasting facility within a threshold distance from the customer premises;

retrieving a first signal transmission power rating for the amplitude modulation broadcasting facility during daytime hours;

retrieving a second signal transmission power rating for the amplitude modulation broadcasting facility during nighttime hours; and determining a time of day that the IPTV service failure occurs based on the first signal transmission power rating for the daytime hours and the second signal transmission power rating for the nighttime hours.

11. The method of claim 10 further comprising:
plotting the first geographical location of the customer premises and the second geographical location of the amplitude modulation broadcasting facility.

12. The method of claim 10 further comprising:
submitting a trouble ticket for the customer premises.

13. The method of claim 10 further comprising:
determining a first mitigation strategy to limit an interference of the amplitude modulation broadcasting facility on an IPTV signal provided to the customer premises based on the first signal transmission power rating for the daytime hours and the second signal transmission power rating for the nighttime hours.

14. The method of claim 13 wherein the first mitigation strategy is to apply filters for a frequency associated with a signal of the amplitude modulation broadcasting facility, wherein the filters are installed at the customer premises.

15. The method of claim 10 further comprising:
correlating a change in power levels for the amplitude modulation broadcasting facility from daytime to nighttime with the IPTV system failure for the customer premises.

16. The method of claim 10 wherein the IPTV service failure causes pixelization of an output of an IPTV signal.

17. A method in a server for monitoring an Internet Protocol television (IPTV) service for a plurality of customer premises, the method comprising:

receiving an alarm signal indicating that the plurality of customer premises have IPTV service characteristics below a threshold level;

identifying an amplitude modulation broadcasting facility within a threshold distance from the plurality of customer premises;

retrieving a first signal transmission power rating for the amplitude modulation broadcasting facility during daytime hours;

identifying a frequency band associated with the amplitude modulation broadcasting facility; and determining a first mitigation strategy to limit interference caused by the amplitude modulation broadcasting facility during daytime hours on an IPTV signal provided to the plurality of customer premises based on the first signal transmission power rating and the frequency band associated with the amplitude modulation broadcasting facility.

18. The method of claim 17 further comprising:
retrieving a plurality of first geographical locations each associated with a respective one of the plurality of customer premises;

retrieving a second geographical location of the amplitude modulation broadcasting facility; and plotting the plurality of first geographical locations each associated the respective one of the plurality of customer premises and the second geographical location of the amplitude modulation broadcasting facility.

19. The method of claim 17 wherein the interference with the IPTV signal causes a loss of the IPTV signal.

20. The method of claim 17 further comprising:
retrieving a second signal transmission power rating for the amplitude modulation broadcasting facility during nighttime hours; and determining a second mitigation strategy to limit the interference caused by the amplitude modulation broadcasting facility during nighttime hours on the IPTV signal provided to the plurality of customer premises based on the second signal transmission power rating and the frequency band associated with the amplitude modulation broadcasting facility.

* * * * *